United States Patent [19]

Voss et al.

[11] Patent Number: 5,626,355

[45] Date of Patent: May 6, 1997

[54] TELESCOPING-TYPE FRONT FORK BICYCLE SUSPENSIONS

[76] Inventors: Darrell W. Voss, 687 Coal Creek Rd.; Gary G. Klein, 103 Smith Dr., both of Chehalis, Wash. 98532

[21] Appl. No.: 221,011

[22] Filed: Apr. 1, 1994

[51] Int. Cl.⁶ .......................... B62K 19/30; B62K 19/38
[52] U.S. Cl. ...................... 280/276; 280/279; 280/280
[58] Field of Search .................... 280/276, 279, 280/280, 274, 270; 403/370, 371, 368, 367, 337, 338, 358, 356, 355

[56] References Cited

U.S. PATENT DOCUMENTS

| 5,238,259 | 8/1993 | Wilson et al. | 280/279 |
| 5,284,352 | 2/1994 | Chen | 280/276 |

FOREIGN PATENT DOCUMENTS

| 497036 | 11/1950 | Belgium | 280/276 |
| 532007 | 10/1954 | Belgium | 280/279 |
| 4292286 | 10/1992 | Japan | 280/279 |
| 612889 | 8/1979 | Switzerland | 280/276 |
| 765114 | 1/1957 | United Kingdom | 280/279 |

*Primary Examiner*—Brian L. Johnson
*Assistant Examiner*—Victor E. Johnson
*Attorney, Agent, or Firm*—Jim Zegeer

[57] ABSTRACT

This invention relates to front fork, telescoping type suspension systems for bicycles. The main focus of the invention is the brake bridge assembly, the fork crown assembly and the joinder of these assemblies to form the fork suspension. The brake bridge assembly serves two main functions: 1) it provides a stiff structural connection between the right and left telescoping struts, to reduce wheel wobble during high speed wheel impacts, and 2) it provides a structural support for the brake cable stop. The invention provides for increased stiffness and lower stresses in the brake bridge, which translates into improved directional stability for the front wheel, less displacement for the brake cable stop .(when the brake loads are applied) and improved fatigue life for the assembly. It also provides for a simpler and less expensive means for mounting the brake bridge to the fork assembly. The invention also encompasses the fork crown producing a lightweight structure with high torsional and bending rigidity. The connections of the stanchions to the crown are achieved through a variety of methods including, (a) interference fit and bonding, (b) collet assembly and (c) "pinch-bolt" connections.

8 Claims, 15 Drawing Sheets

FIGURE 1A
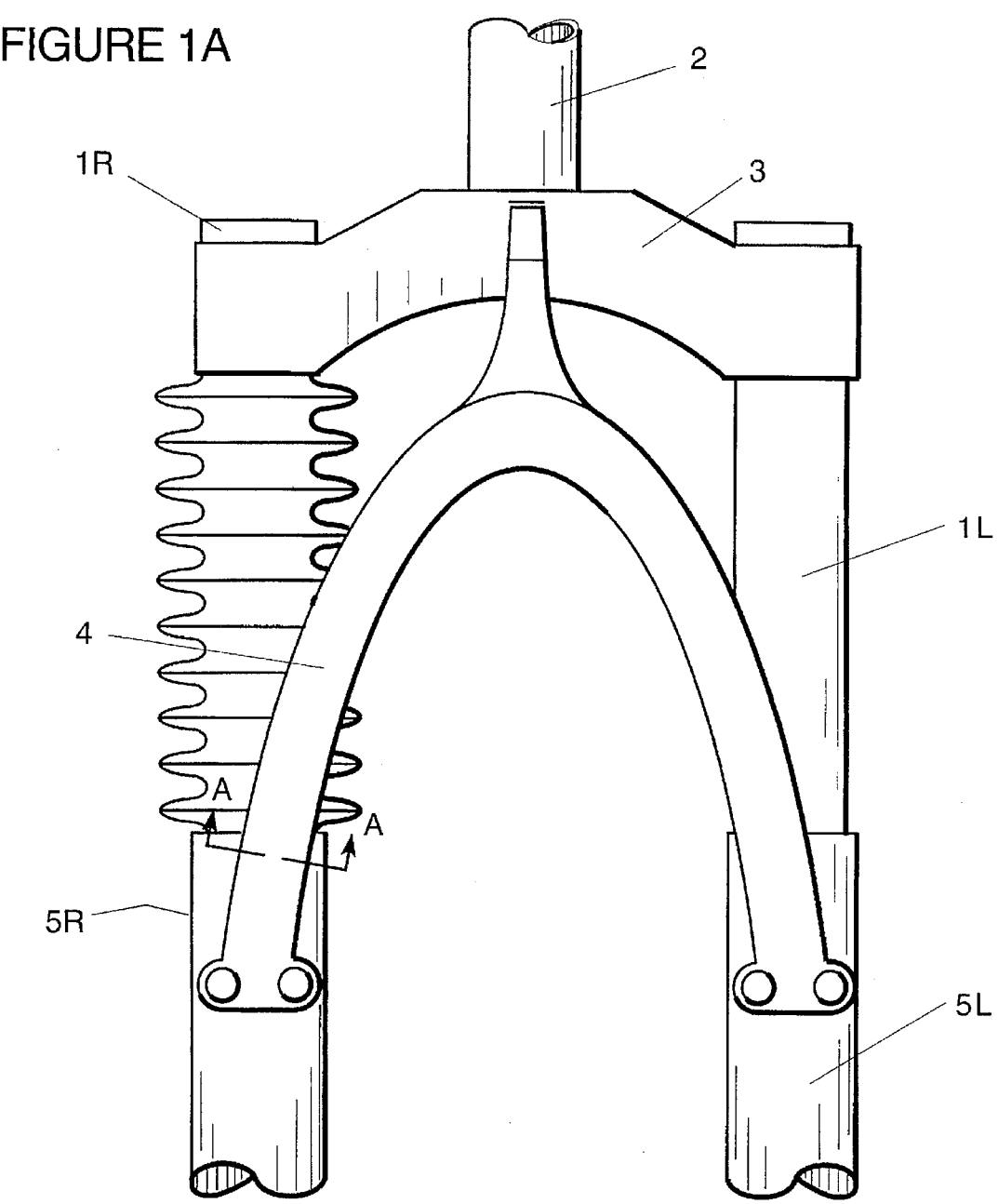
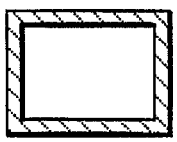
SECTION A-A
FIGURE 1B

SECTION A-A

SECTION A-A

SECTION A-A

TELESCOPING-TYPE FRONT FORK BICYCLE SUSPENSIONS

INTRODUCTION

This invention relates to front fork, telescoping type suspension systems for bicycles. The invention is comprised of an improved fork crown, a brake arch structure and attaching means to other fork components. The crown structure is that part of the suspension that connects the stanchion tubes (the upper part of the telescoping assembly) to the steerer tube. The brake arch attaches the upper portion of the right sliding fork leg or strut to the upper portion of the left sliding fork leg or strut, as well as supporting the brake cable stop and brake caliper assembly (in the case of cantilever brakes). The invention provides a simple and inexpensive means for reducing the overall fork weight and at the same time improving the bending and torsional stiffness and strength of the overall fork, and specifically the fork crown and brake arch components.

The invention provides an improved method for mounting the stanchion tubes to the fork crown and lower fork tubes to the brake arch, using a collet, wedge, pinch bolt or bonded assembly. Except in the case of the bonded assembly, these methods allow quick assembly and disassembly of the suspension system, for repairs and parts replacements.

BACKGROUND

In the design of competition bicycles and bicycle parts, weight and stiffness are critical issues. Extremely lightweight structures and structural components are used in the most serious competition bicycles. These lightweight components must be designed for a variety of severe riding environments. This results in a design that must operate at relatively high stresses, close to the strength limits of the materials being used. The demand for a minimum weight bicycle has led the industry into the use of modern, high performance structural materials, such as high strength aluminum, carbon fiber composite and titanium alloys. These high strength materials require more care in the design of fittings and joints because of, a) their susceptibility to fatigue cracking and b) the relatively high load levels at which the fittings and joints are required to operate.

A goal for a bicycle part manufacturer is to eliminate all unnecessary weight from a given part, without compromising its structural integrity and stiffness. There are numerous bicycle suspension forks currently on the market that are not very weight efficient. They have been designed for basic suspension function, without adequate consideration for weight optimization or steering and braking control. Most of the prior art telescoping front fork suspensions fall into this category. These designs tend to be relatively heavy and their stiffness to weight and strength to weight ratios are not very high. They are also relatively flexible laterally and in torsion and cannot provide the stability and accurate steering and braking control for the front wheel assembly that is desired for serious competition cycling. Laboratory tests show that some of the prior art fork designs have torsional spring rates as low as 84 in-lbf/deg and lateral spring rates as low as 140 lbf/in. Some of the heavier steel forks have torsional spring rates in the neighborhood of 230 in-lbf/deg and lateral spring rates of nearly 170 lbf/in, however, their weight exceeds 1500 grams. Based on studies, it has been found that a torsional spring rate in excess of 230 in-lbf/degree and a lateral spring rate in excess of 170 lbf/in is desirable for maximum steering control in competition cycling. The weight of the suspension should be less than 1000 grams.

Most of the prior art fork suspensions use brake arch designs that are inherently too flexible to control wheel wobble and braking action. The name "brake bridge" or "brake arch" says it all. The part was designed and located simply as a support for the brake cable hanger and possibly the brake mounts, similar to the part of the same name used on the rear seat stays of the bicycle. The prior art designs did not realize that the lower sliding tubes need to be rigidly linked to each other in torsion and bending in order to provide top performance of the cantilever brakes and the overall suspension fork assembly.

The present invention uses a unique design for the separate crown structure and brake arch assembly to dramatically increase the strength and stiffness of the fork while reducing weight. The crown structure and the brake arch play key parts in the overall stiffness of the front fork assembly. The invention also provides an improved method of assembly of the various key parts of the suspension fork to reduce manufacturing costs as well as make the system easier to assemble and disassemble for parts and repairs.

PRIOR ART DESIGNS

Prior art front fork suspensions come in a variety of sizes and shapes as shown in FIGS. 1–5 (common components are identified by a numeral preceded by the figure number). Most of the more popular designs use telescoping struts, operating pneumatically, hydraulically, elastomerically or with metallic springs to achieve the suspension action. FIG. 1 illustrates the structural arrangement typical of these designs. For example, some forks utilize a unicrown 3 type of construction (used on many non-suspended forks), consisting of a tight bend created in the top of the fork blade, where the fork blade is directly attached, through brazing, welding or other means to the steerer tube 2. FIG. 2 illustrates the unicrown type fork design. The integral blade and crown form the upper tube of the suspension. This type of construction has the advantage of not having a separate fork crown, but it also has several disadvantages. The curved tube upper structure coincides with the most highly stressed region of the fork. Under stress, the essentially round or elliptical sections deform significantly out of round, creating excessive movement and stress concentrations. The process of bending the curve into the tube stretches and thins the outer wall of the tube, weakening it. The welded or brazed joint to the steerer is a weakened area as a result of the thermal effects, residual stress and stress risers due to the joint configuration. The bent and welded type of construction does not lend itself to a highly accurate alignment of the two upper fork blades, or stanchion tubes, which make it difficult to make a high precision sliding structure.

For the separate fork crown member type of design (FIG. 1), the stanchion tubes (the stationary part of the telescoping assembly—Items 1L and 1R) are connected to the steerer tube (2), by a common crown part (3). The crown is typically made of aluminum alloy, either machined out of solid or forged, with subsequent machining of the steerer and stanchion tubes fitting surfaces. In prior art, the stanchion tubes are retained by adhesive, interference fit or pinch bolts, or a combination of the above. The structural support between the steerer tube and the stanchion tube is typically either a solid rectangle or inverted channel shape.

Generally, one of the most critical and highly loaded parts of the suspension fork design is the crown structure (3). This part must be designed to handle both bending and torsional loads resulting from frontal and side impacts to the wheel. The crown acts as a structural transfer member to transmit the impact loads to the steerer where these loads are distributed to the head-set bearings and eventually to the bicycle frame.

Also, very important to the stability and performance of a telescoping type suspension fork is the brake arch or brake bridge, as it is sometimes called. The brake bridge connects the two struts and causes them to telescope together during wheel impact, thereby minimizing wheel "wobble". If the two telescoping tubes are allowed to move independently, the wheel will wobble and create high stresses at dropout/axle connection. Neither condition is desirable. The brake bridge provides resistance against the up-down, for-aft and rotational (torsional) movements of the struts, forcing the wheel to run true during full suspension travel. The brake bridge (4) also serves as a structural support for the brake cable stop (6).

There are several configurations that are currently used for the brake bridge. FIG. 1 shows the configuration for one of the leading fork designs. This design uses an arched beam having a variable rectangular section. At the end connections the section is basically a hollow rectangular tube. Near the top of the arch the section becomes solid. In between the height of the section is constant but the width is variable. The ends of the beam are connected by fasteners.

FIG. 3 illustrates a plate type arch which is sometimes used in prior art designs. This concept is inherently weak in out-of-plane bending and torsion and tends to be heavy.

FIG. 4 illustrates a small diameter tube type arch which have sections that are too small to provide the rigidity needed. Usually these designs have tube diameters less than half the diameter of the stanchion tubes. These designs are relatively flexible in torsion.

FIG. 5 illustrate an I-beam arch that is currently used. I-beams are inherently weak and flexible in torsion and cannot really function properly for this application. The invention provides for substantially increased stiffness and lower stresses in the brake arch, which translates into improved directional stability for the front wheel, less displacement for the brake cable stop (when the brake loads are applied) and improved fatigue life for the assembly. The tube diameter for the arch is roughly the same as the stanchion tubes, giving it significantly more torsional and bending stiffness than prior art designs. The invention also provides for a simpler and less expensive means for mounting the brake bridge to the fork structure.

The performance of a telescoping type of suspension front fork is similar to a chain, that is, it is only as strong as the weakest link. The stiffness of a structure is not additive, the deflections of a structure under load are. If three load bearing parts of a fork are quite stiff, but two load bearing parts deflect greatly, the overall deflection will be large because of the flexible parts.

This is the case with prior art forks. Because of strength, weight and economic considerations, the steerer tubes, stanchion tubes and lower sliding tubes are typically of adequate strength and relatively light weight. The steerer tube is highly loaded in bending, and is typically adequate in torsion and bending stiffness. It only sees the torsion loads involved with steering. The stanchion tubes see predominately large bending stress, and are typically of adequate stiffness in this mode as well. The lower sliding tubes are typically larger in diameter than the stanchion tubes as they house the sliding bearings and fit over the typical stanchion tube, and as such typically have considerable inherent stiffness.

It is easy to design and manufacture a straight wall or butted tube with good properties. The brake arch (and to a lesser degree the fork crown), on the other hand, need much more stiffness than their strength requirements dictate. The only thing tying the lower fork legs together besides the brake arch in most telescoping type forks is the front wheel axle. As a lateral force is applied to the wheel in contact with the ground, such as in cornering, the lower fork blade on one side is compressed and the other one is extended. Only the wheel axle and the brake arch resist this shearing action.

When the cantilever brakes are applied in stopping, they push outward and also put a large amount of torsion on the two lower fork tubes. Since the lower fork blades are free to twist on the stanchion tubes, the resistance to the torsion is provided by the wheel axle and the brake arch. The outward pushing force will create additional stress on the sliding bearing assembly, substantially increasing the sliding friction. This has the result that the fork suspension will not work freely while braking. It tends to "lock up".

When steering forces are applied to the front wheel, as when trying to steer the front wheel out of a rut, the lower sliding assembly of the fork will twist, as will the fork crown, reducing the riders control. When the wheel does not follow in the direction the rider has steered the handlebars, a crash is often the result.

Some companies have tried to increase the stiffness of the overall assembly by increasing the axle diameter on special "suspension" hubs from 9 mm to 10, 11 or even 12 mm in diameter. This is still relatively small, and coupled with the not totally rigid quick release wheel/dropout joint, does not provide the additional rigidity that the lower sliding portion of the suspension forks need.

It appears that some products have realized the nature of the flex problem, as there are aftermarket reinforced brake arches to improve the stock suspension forks. These reinforced arches have a typical flat plate or light weight I beam construction, often with lightening holes drilled through it. The companies have picked up on the need for shear resistance, but have not addressed the torsion rigidity needs. The modified arches still bolt onto the lower fork blades in the original non rigid manner.

The present invention uses a unique design for the brake arch to increase its strength and stiffness an order of magnitude with little or no increase in weight. The invention also provides an improved method for mounting the brake bridge to the lower fork structure. This helps to reduce manufacturing costs as well as make the system easier to assemble and disassemble for parts and repairs. The improved method also results in much higher rigidity through the joint.

Prior art designs for the brake arch tend to be relatively flexible, due to their small section geometry and poor end connections. This allows the wheel assembly to move from side to side during severe side and vertical bump loadings. Also, these designs, because of the bridge layout and section geometry, requires that the brake cable stop (6) be cantilevered quite a distance from the axis of the bridge. This introduces higher torsional and bending stresses in the bridge and greater displacements at the brake cable stop (6), when the brake loads are applied. This invention overcomes these difficulties by introducing a superior section geometry and more substantial end connections for the bridge. This adds significantly more flexural and torsional rigidity to the bridge structure. Also, because of the larger section geometry of the brake bridge, the brake cable stop (6) is more in line with the bridge axis (less cantilever action) thereby reducing the local bending and torsional stresses from the brake cable stop loads. The end connections of the bridge are also designed for ease of assembly and disassembly, in the case of the bolted, wedge or collet versions.

The objectives of this invention are: a) minimize the weight of the entire suspension fork assembly, b) create a "stiff" suspension structure where the wheel motion is restricted to the desired vertical travel only, and cannot move laterally or torsionally in the fork. c) Maximize the lateral stiffness of the entire fork. d) increase the yield and fatigue strengths of the fork and its attachments, e) reduce the bending and torsional deflection of the brake arch structure and brake attachments from braking and f) improve the method of assembling the bridge structure and the fork crown to the fork.

BRIEF DESCRIPTION OF DRAWINGS

The above and other objects, advantages and features of the invention will become more apparent when considered with the following specification and accompanying drawings wherein:

FIGS. 1(A) and 1(B) illustrate the structural arrangement of a typical prior art, telescoping, front fork suspension system.

DETAILED DESCRIPTION OF THE INVENTION

This invention addresses four key structural parts found on most prior art, bicycle, front wheel, telescoping suspension systems. These parts are:

1. The brake bridge assembly.
2. The fork crown.
3. The Brake bridge connection.
4. The Crown/stanchion-tube connection.

The key parts to the invention are illustrated in FIGS. 6, 7 and 8. In FIG. 6, the invention is directed to an improved crown (6-3), an improved brake bridge (6-4) and improved bridge connectors (6-7L and 6-7R and 7R, 7R not shown). The structural assembly created by these parts forms a structural connection between the left and right telescoping struts (6-5L and 6-5R, 6-5R 5R not shown), the brake cable (at the brake cable stop - 6) and the brake pivot stud (6-8). FIG. 7 shows a more detailed schematic of the optimized crown which basically consists of five intersecting hollow tubes, T-1, T-2, T-3, T-4 and T-5 giving it exceptionally high bending and torsional stiffness at minimum weight. FIGS. 8A and 8B illustrates the crown-to-stanchion connection covered by this invention. Several options are shown.

The invention provides for a larger and more efficient section for the bridge structure (6-4 of FIG. 6), to handle the bending and torsional loads imposed during rough riding and panic braking maneuvers. Stronger and more rigid connections are also provided at the telescoping struts 6-7L and 6-7R, 6-7R not shown). These connections also provide a more convenient method for mounting the brake bridge assembly to the fork. The geometry provided by the invention gives a much better alignment of the brake cable stop with the centerline of the brake bridge, thereby reducing the bending and torsional loads imposed by the brake cable.

Figure 6A:
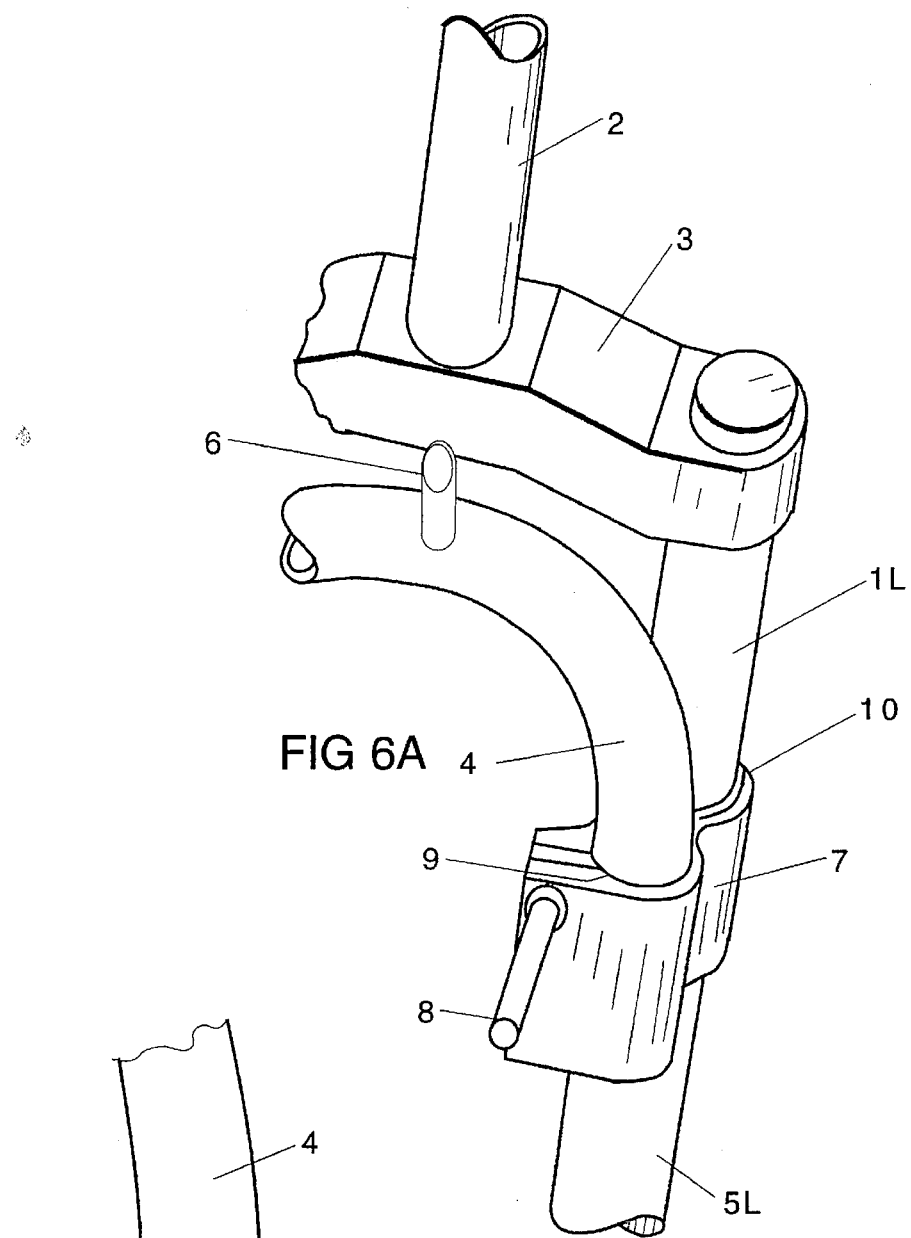
FIGS. 6a, 6b, and 6c illustrates the front fork incorporating the invention, showing the improved brake bridge, crown and several methods for connecting the assembly.
Figure 6C:
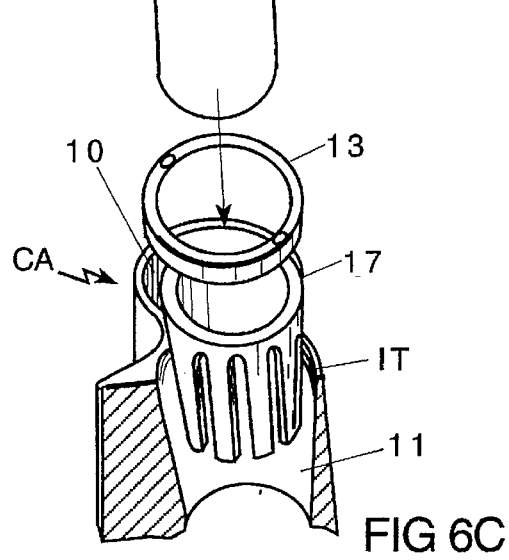
Figure 6B:
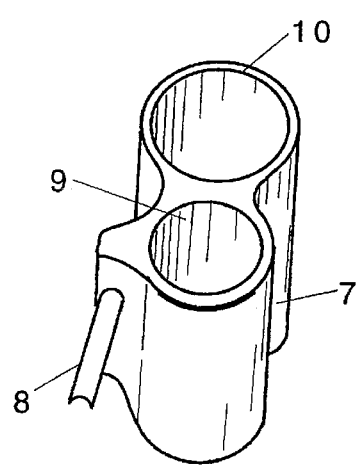

Three embodiments for the brake bridge connections are shown in FIGS. 6a, 6b and 6c. Embodiment A, shown in FIG. 6a, is a pinch bolt connection. The brake pivot stud (6-8) serves as one of the two threaded bolts in the connection. The threaded connection TH itself is slotted at the bridge socket 8-9 to allow clamping of the bridge ends. The preferred design for the stanchion socket (6-10) is a bonded connection, however, this socket could be a pinch bolt connection as well. Embodiment B in FIG. 6b is a fully bonded connection. Both the bridge socket (6-9) and the strut socket (6-10) are designed for bonded connections. Embodiment C (FIG. 6c) uses a full or partial collet assembly to form the connections. The collet assembly consist of a tapered compression wedge (6-12) and an adjuster ring screw (6-13) which is secured in place, during assembly, using a spanner type wrench.

The invention also focuses on the crown structure (FIG. 7) with the following objectives: a) minimize structural weight, b) reduce stress concentrations to improve fatigue life, c) increase the structural stiffness of the part in the direction of loading and c) improve the method of assembly.

The invention provides for a stronger and more versatile method for mounting the telescoping tube assembly to the crown. The improved designs (FIG. 8) will help reduce wheel wobble and the stresses at the front dropout/axle connection during use. It will also make it easier to assemble and disassemble the suspension for replacement of parts.

IMPROVED BRAKE BRIDGE ASSEMBLY

The improved brake bridge design of this invention helps to reduce wheel "wobble" during high speed travel. This is accomplished by the increased stiffness provided by the "oversize" brake bridge structure. This allows less relative movement between the right and left telescoping struts during compression, forcing the wheel to run true. The reduced "wobble" in the wheel also reduces the stresses at the front dropout/axle connections. The invention uses a large tubular section for the brake bridge arch (6-4), as indicated in FIGS. 6a, 6b and 6c. The section geometry could be round, square or triangular, or other shapes. Because of the torsional stiffness desired through the curved tube, a triangular or square section is contemplated as most optimal. The diameter of the bridge is in the range of 24 to 30 mm, or similar or larger in dimension to the main tubes of the fork such as the steerer or stanchion tubes. As the brake arch is more stiffness critical than strength critical, the wall thinning that takes place on the outside surface of the bend is not a problem. Larger diameters can be used for the brake arch, with the ends tapered down to fit the same end connections. The large tubular section geometry provides good bending and torsional stiffness at relatively low stresses, compared to the small rectangular or round tubular, or solid plate sections commonly used in prior art designs. The circular geometry also adds greater versatility and strength for the end connections.

SUPPORTING STRUCTURAL ANALYSIS

Computerized structural analysis of the invention was conducted using the finite element analysis (FEA) method. This method of analysis is widely used in industry for evaluating all types of structures. The FEA method breaks the material continuum of a structure into a finite number of mathematical elements. These elements may be one-dimensional beams, two- and three-dimensional shells or three-dimensional solids. The deformation characteristics of these elements are defined in terms of their nodal displacements (nodes are the connecting points of the finite elements) and the forces externally applied to these nodes. By defining the material properties, the geometry of the finite element system, the locations, directions and magnitudes of the applied forces and the boundary conditions of the structure, the displacement and stress distribution within the material continuum can be calculated.

Figure 9:
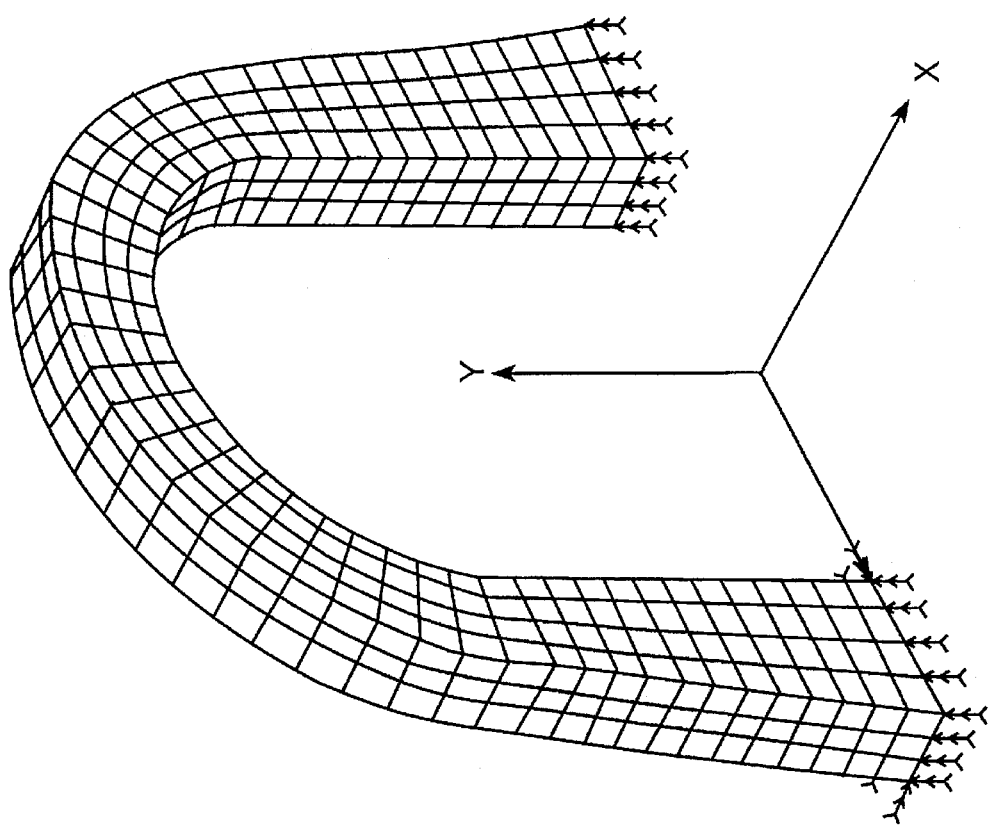
FIG. 9 shows the finite element model for a leading prior art brake bridge design.
Figure 10:
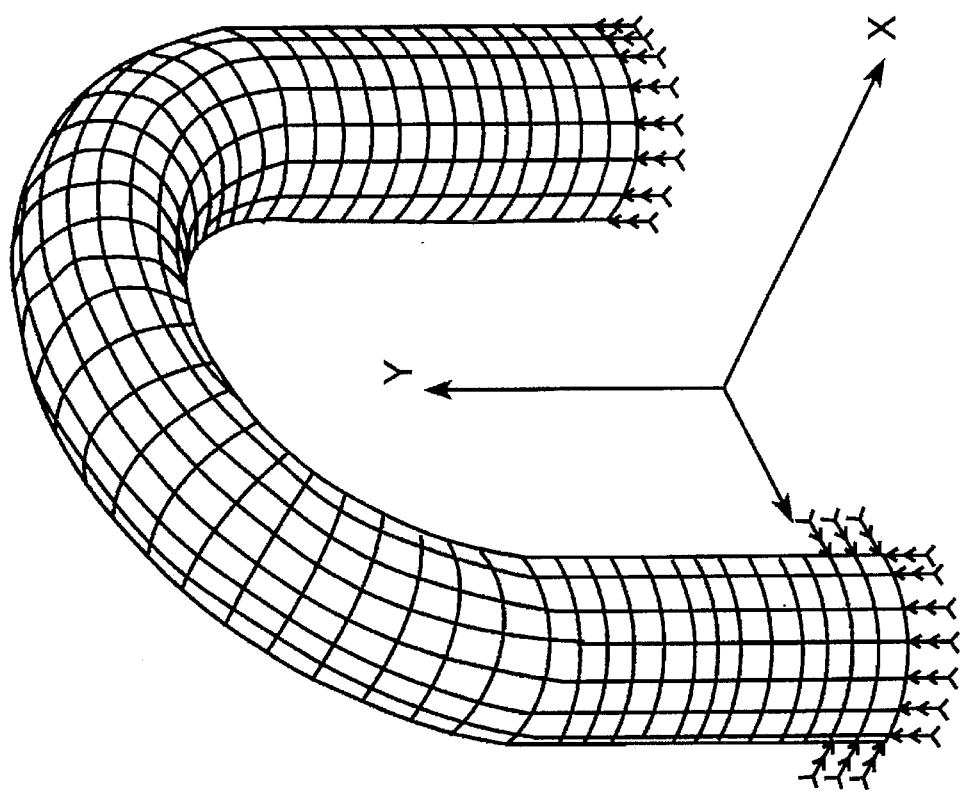
FIG. 10 shows the finite element model for the brake bridge design covered by this invention.

A comparative study was conducted to evaluate the strength and stiffness of the disclosed design against a leading prior art brake bridge design. FIG. 9 shows the finite element model used for the prior art design and FIG. 10 shows the model for the design covered by this invention. The model consists of the bridge arch, rigidly fixed against translation and rotation at one end and partially fixed (against rotation along the vertical axis) at the other. The "free" end is loaded with a specified concentrated load (either a horizontal load in the x-direction or a vertical load in the y-direction). The stiffness comparison of the two designs were accomplished by comparing the maximum displacements for each model with a specified load. The strength comparison was accomplished by comparing the peak VonMises stresses in the model. The results of this study indicated that the invention gives a horizontal stiffness of approximately four times that of the referenced prior art design and a vertical stiffness that is approximately double the prior art design. The peak stress in the disclosed design was less than half the stress of the reference design. This was accomplished with approximately the same structural weight as the prior art design.

Since the reference design represents one of the stronger designs on the market, it can be concluded that the invention will be at least three times and stiff and twice as strong as prior art designs. For several prior art designs we investigated, the invention appears to be close to ten times as stiff.

IMPROVED BRAKE BRIDGE END CONNECTORS

The invention illustrated in FIGS. 6A, 6B and 6C provides several methods for securing the brake bridge structure to the telescoping struts. The circular geometry of the bridge structure makes the end connection designs easier to manufacture and install and reduces the localized stresses in the connection. The connector member or part (6-7) is made from a metal extrusion or a reinforced plastic molding. The part is slipped over the telescoping strut (6-5L) and bonded into place. The part includes a socket (6-9) for the brake bridge (6-4) and a flange part to accommodate a drilled and tapped hole for the brake pivot stud (6-8). The bridge socket (6-9) does not have to be circular but could take on a "D" shape to give more locking strength. The socket could even be tapered with a transition from a circular shape to a "D" shape and the bridge part staked into place, forcing the circular bridge tube to conform to the "D" shaped portion of the socket. A structural adhesive could be added to improve the strength of the joint.

In FIG. 6a, embodiment A illustrates a slotted pinch bolt clamp PBL secured with the use of bolts. One of the bolts is the brake pivot stud (6-8). This design makes the assembly and disassembly of the brake bridge quite easy, however, the design will impose a cost and weight penalty due to the added bolt and a cost penalty due to the extra threaded hole TH.

Embodiment B (FIG. 6b) illustrates an end fitting design using adhesive bonding. Both the stanchion socket (6-10) and the bridge (6-9) are designed for bonding. This option has the advantage of lightness and improved fatigue strength but it does not provide an easy means for disassembly.

Embodiment C (FIG. 6c) uses a collet assembly CA to make the connection. The collet assembly has an inner taper (6-11), internal threads IT, a sliding compression wedge (6-12) and a ring adjuster screw (6-13) engageable with thread IT to lock and drive the collet wedge finger into position. The compression wedge (6-12) can be made with or without machined slots. The slots boring the fingers tend to make the wedge conform more closely to the mating surfaces thereby giving a more uniform locking force. The inner taper and the sliding wedge piece can be of any angle from 0.1 degrees to 18 degrees, relative to the axis of the stanchion tube. The compression wedge can be made of metal, an engineering plastic or reinforced plastic material. The collet assembly works by using the adjuster screw to force the wedge piece between the inner taper and the external surface of the stanchion tube, until the desired locking force is generated. To disassemble the bridge, you simply loosen the adjuster screw.

The preferred method of assembly for economy of manufacture is an interference fit or bonding assembly, or a combination of the two. It is more costly to slot, drill and tap for pinch bolts, or make an additional part such as a wedge or collet. For ease of assembly and disassembly, the disclosed wedge or collet system is preferable to the pinch bolts. The threaded holes of the pinch bolts have demonstrated failures in use. Fatigue or yield cracks propagate from them. Also the pinch bolts apply a concentrated load on the brake bridge tube, weakening it. The bonded, wedge or collet assemblies evenly spread the clamping loads.

IMPROVED BRAKE CABLE ALIGNMENT

The brake cable hanger (6-6), also called the brake cable stop, is assembled to the brake bridge by welding. The geometry of the over-sized bridge structure allows the brake cable to be more closely aligned with the center-line of the bridge. The geometry also reduces the cantilevered length of the cable hanger. These effects reduce local bending and torsional loads on the bridge structure and the welded connection. Comparing this improved geometry with several prior art designs indicate that the invention will reduce the brake cable loading of the connection by as much as 70 percent.

IMPROVED FORK CROWN DESIGN

As noted earlier, the crown part of the invention (FIGS. 7A, 7B, 7C) is essentially composed of 5 integral and intersecting hollow tubes T-1, T-2, T-3, T-4 and T-5. There is very little solid mass as there are no thick sections. The outside surfaces of the stanchion tube sockets would be weakened by the machined hole. To compensate, the walls are reinforced around the upper and lower periphery of the stanchion tube sockets and especially around the lower periphery, which is a beneficial area as the strains would ordinarily be largest in the upper and especially lower sections in a typical prior art straight wall or more commonly thickened wall in the center section.

Figure 7B:
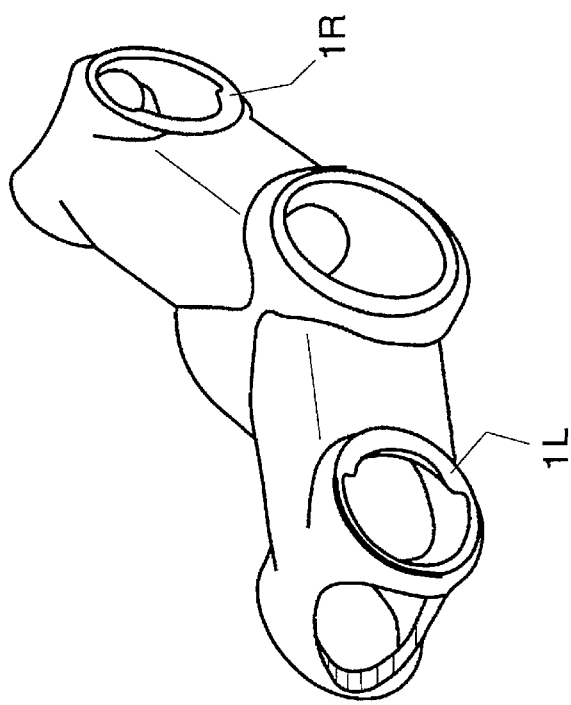
FIGS. 7a, 7b and 7c illustrate the improved crown part of this invention.
Figure 7A:
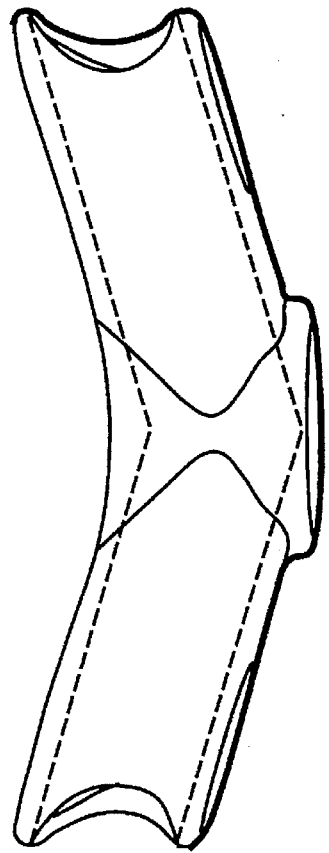
Figure 7C:
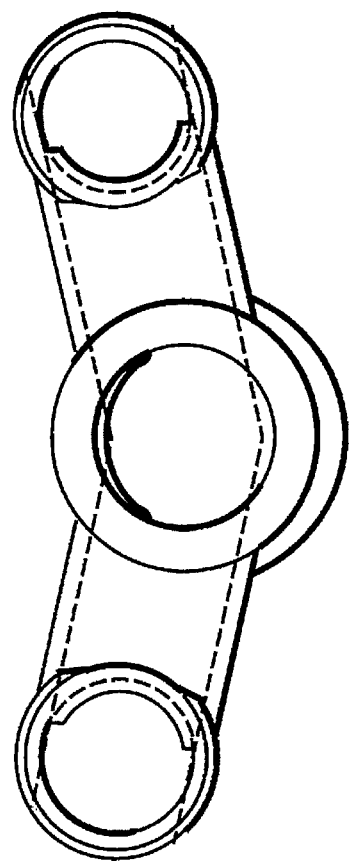

Also, shown in FIGS. 7A, 7B and 7C are extensions into the stanchion tube sockets to provide a positive stop for the stanchion tubes in the axial direction. This relieves the joint from excessive shear stresses since the extensions take a direct bearing load during impact.

The crown part of the invention is economical to manufacture. The crown begins as a solid simple forging with no slides or undercuts. It is subsequently machined for the steerer and stanchion tube sockets, followed by lateral boring of the cross sections (the lightening holes) forming the five hollow tubes discussed earlier. If the steerer fitting surface is machined as in a lathe, a contour cut can be made at the same time or in the same setup, neatly trimming the flash from the upper surface of the crown forging with minimal additional cost. The Boring from the side is economical compared with CNC machining slots underneath the cross portion of the crown such as in prior art designs.

SUPPORTING ANALYSIS

The basis for the disclosed crown design is a simple principle learned in a basic course in strength of materials. In principle, the most efficient method for supporting bending and torsional loads is with a hollow, closed, structural section. This principle is especially true for torsional loads, as can be illustrated by the following example.

Figure 11A:
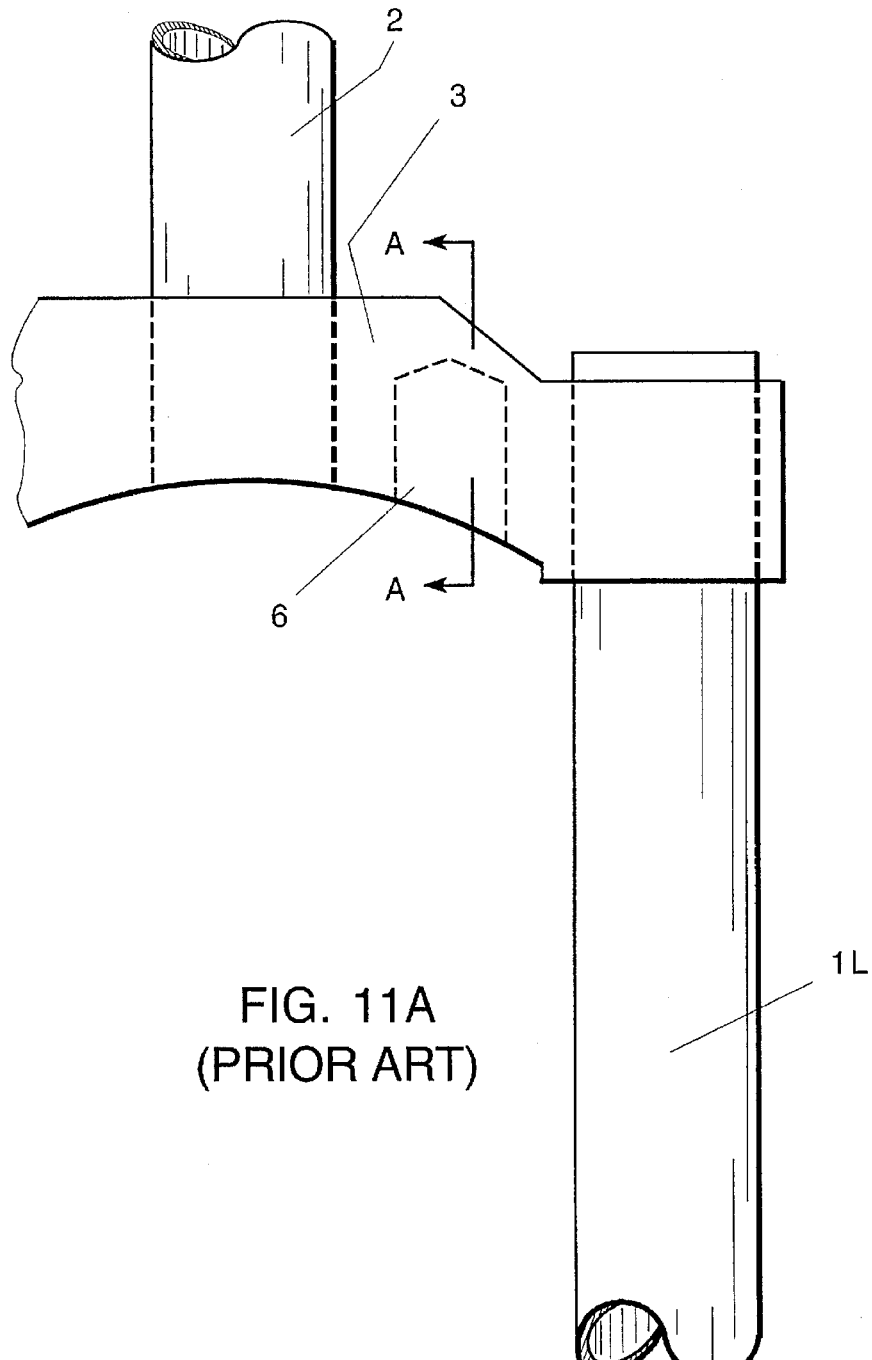
FIG. 11a illustrates a prior art crown design for a common telescoping front fork suspension currently on the market.
Figure 11B:
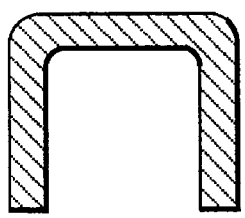
FIG. 11b is a sectional view on lines AA of FIG. 11a, FIG. 12A illustrates an improved crown design concept covered by this patent.

FIG. 11 illustrates a prior art crown design with a lightening hole or slot 12-6, machined or formed from underneath the crown as shown. The location of this lightening hole is detrimental to the design since all of the bending and torsional loads must pass through this region as they are transferred to the steerer tube. This lightening hole arrangement creates an "open" section (see Section A—A) at the critical region in the crown structure. This open section is characteristic of many prior art crown designs.

Figure 2:
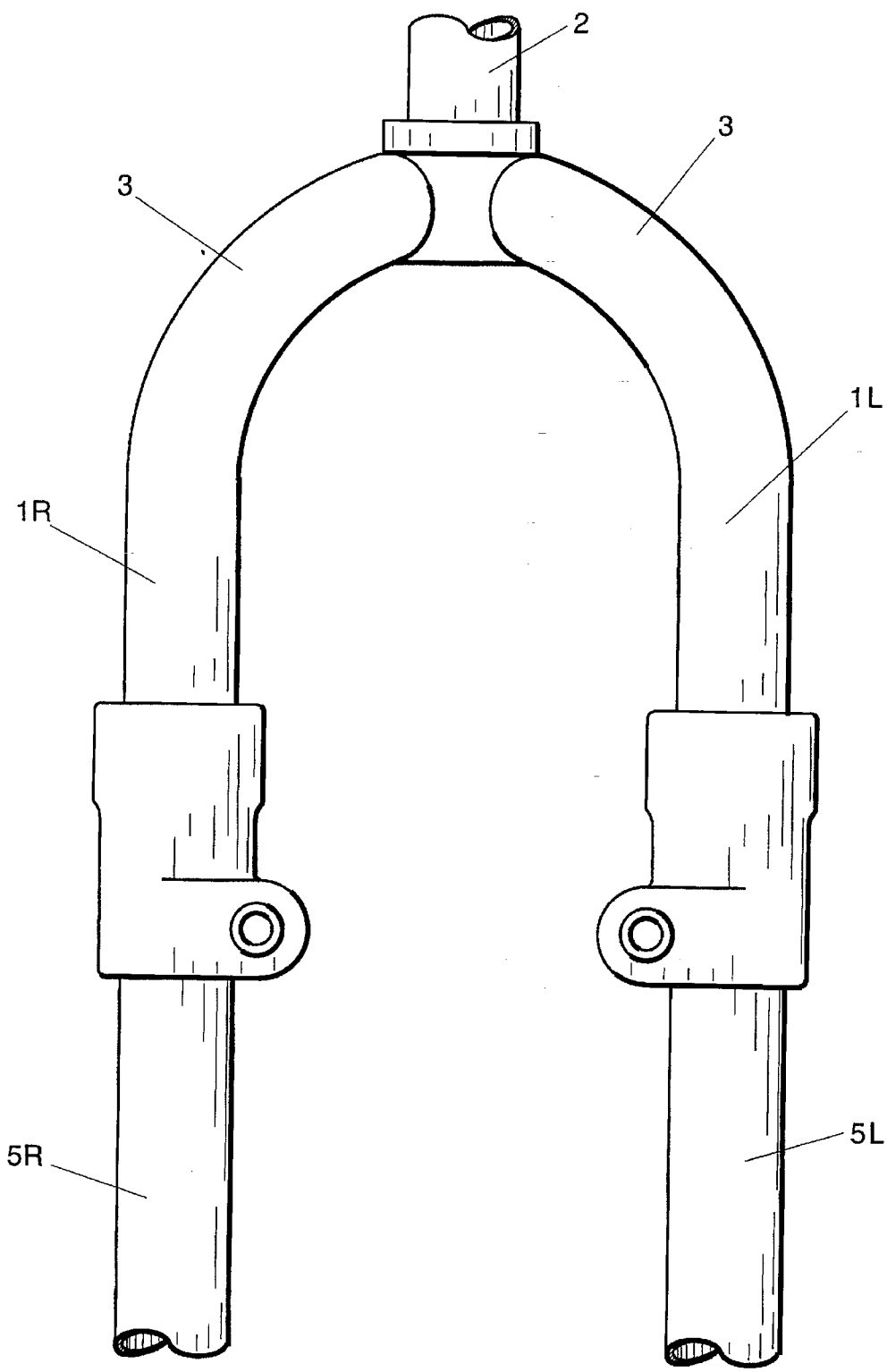
FIG. 2 illustrates the structural arrangement of a typical prior art, uni-crown fork structure.
Figure 3:
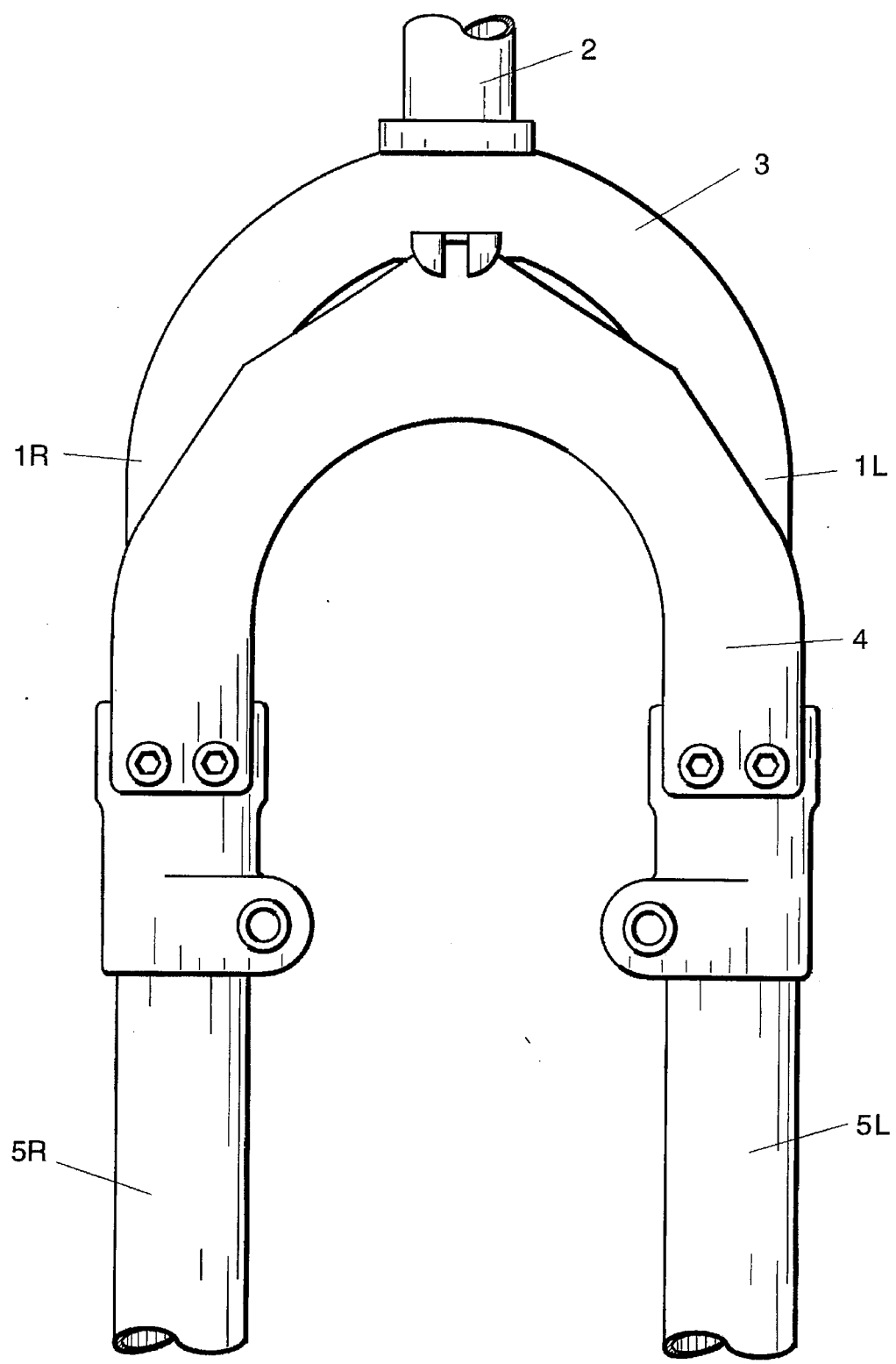
FIG. 3 illustrates the structural arrangement of a typical prior art, plate type arch structure.
Figure 4:
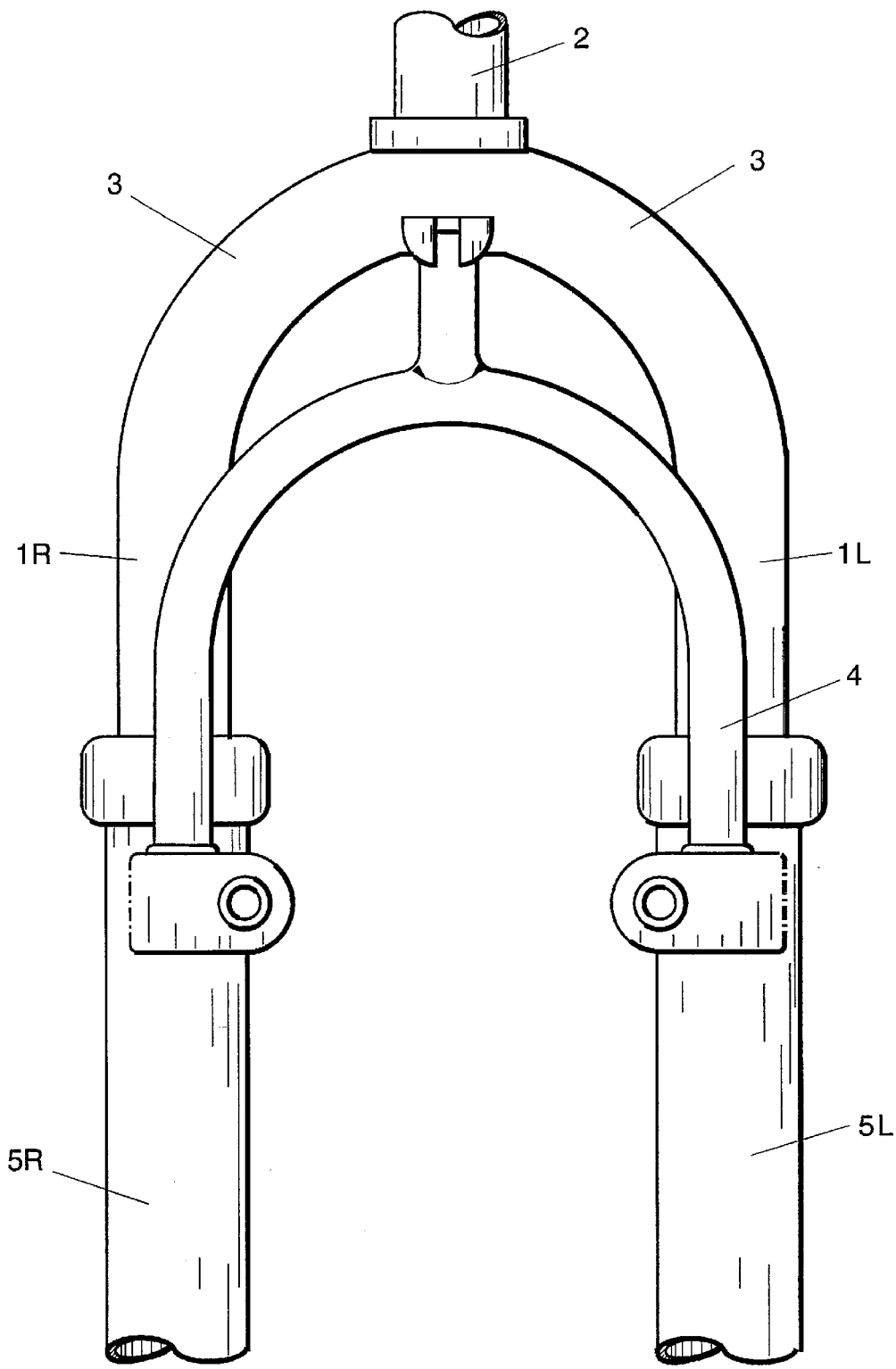
FIG. 4 illustrates the structural arrangement of a typical prior art, small diameter tube type arch structure.
Figure 5:
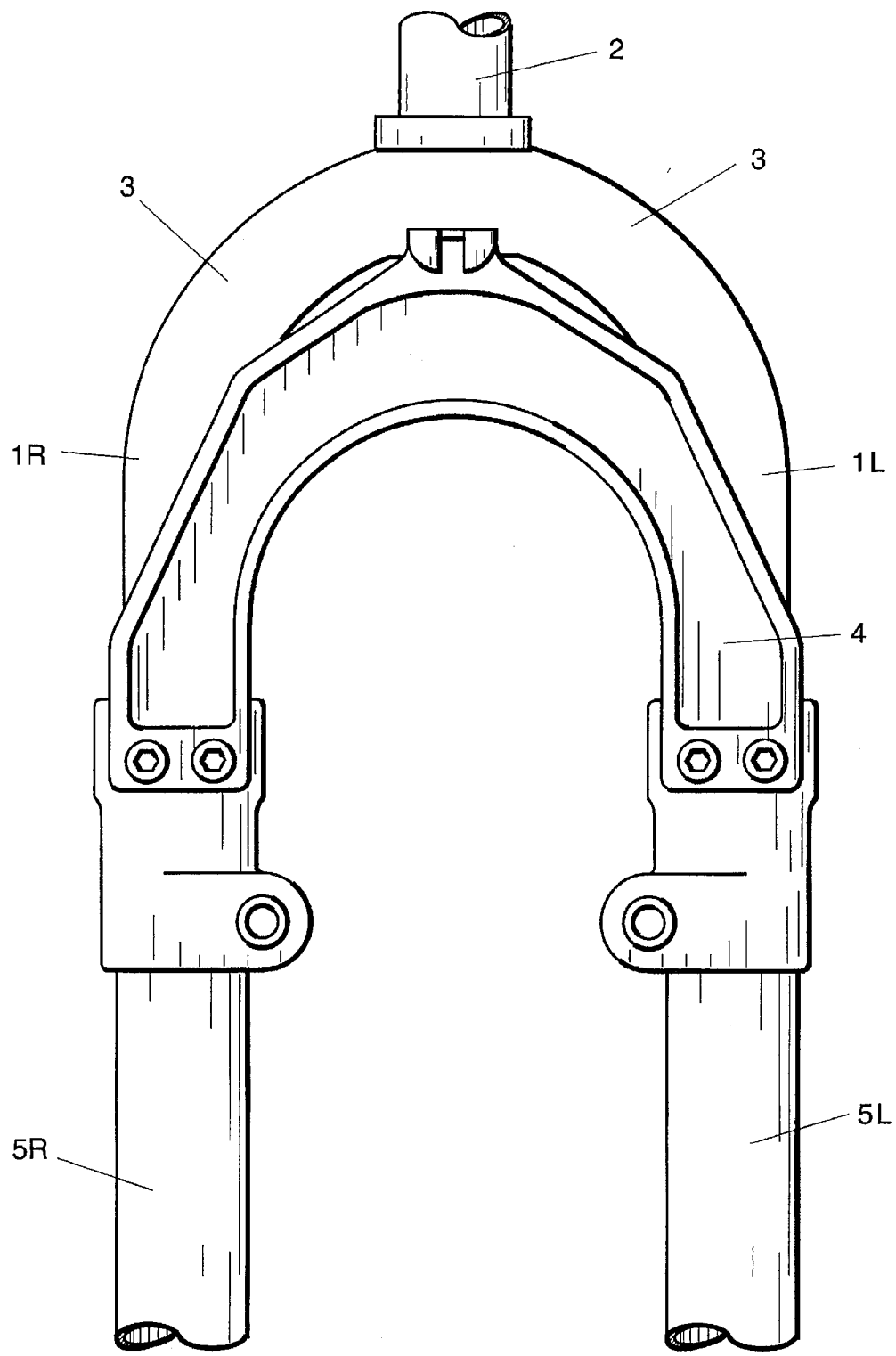
FIG. 5 illustrates the structural arrangement of a typical prior art, small diameter tube I-beam type arch structure.

From the text, "Roark's Formulas for Stress & Strain", by Warren C. Young, the approximate equations for the maximum shear stress and the end rotation of an open section is, $$Ss(\text{max}) = T(3U + 1.8t)/(U^2 * t^2) \quad [1]$$

$$\text{Disp} = T*L/(K*G) \quad [2]$$

$$U = 2b + a - 2t \quad [3]$$

$$K = U*t^3/3 \quad [4]$$

where,

T=applied torque, in-lbf
U=length of median line of open section, in
t=thickness of part (see Section A—A, FIG. 2), in
b=height of section (see Section A—A, FIG. 2), in
a=width of section (see Section A—A, FIG. 2), in For discussion purposes, lets assign the following numbers (these numbers are considered to be representative of prior art designs):

T=1000 in-lbf
a=1.1 in
b=0.9 in
t=0.188 in
L=1.0 in
G=3.9×10^6 psi

Using Equation 2, we have:

$$U = 2(0.9) + 1.1 - 2(0.188) = 2.524 \text{ in}$$

Using this value for U in Equation 1, we obtain:

$$Ss(\text{max}) = 1000(3*2.524 + 1.8*0.188)/(2.524^2 * 0.188^2) = 35{,}132 \text{ psi}$$

Using the value for U in Equation 4, we obtain:

$$K = 2.524 * 0.188^3/3 = 0.00559 \text{ in}^4$$

Using the above value for K in Equation 2, we obtain:

$$\text{Disp} = 1000 * 1/(0.00559 * 3.9\text{E}6) = 0.0459 \text{ rad}$$

For the assumed conditions in our example, the maximum shear stress acting on the section is approximately 35 ksi and the torsional rotation is 0.0459 radian.

Figure 12A:
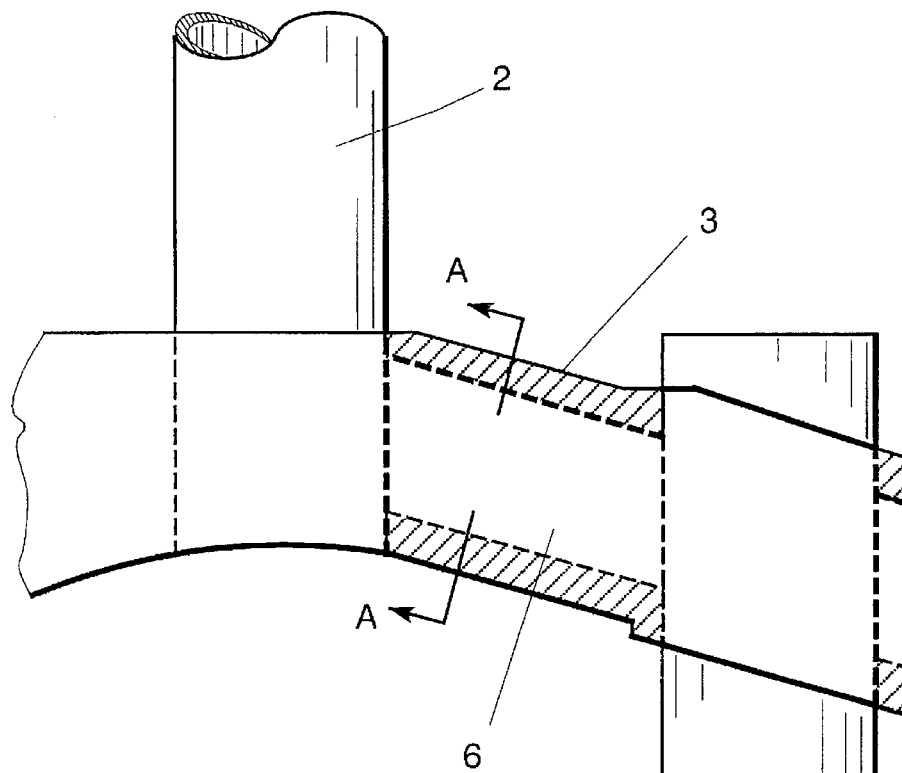
FIG. 12B is a sectional view on lines AA of FIG. 12A
Figure 12B:
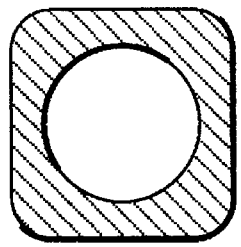

Now, lets consider the crown design of the invention, illustrated in FIGS. 12A and 12B. The section geometry is a closed, hollow tube (with four reinforcing corners) connecting the stanchion tube (12-1L, 12-1R-12-1R not shown) and the steerer tube (12-2). The lightening hole is made laterally through either side of the crown body, by a drilling or machining operation. This allows more material to be removed from the crown as well as creating the more efficient "closed" structural section, illustrated in Section A—A.

The text by Young gives the following approximate equations for the maximum shear stress and the end rotation for a hollow, closed section:

$$Ss(\text{max}) = T/(2tA) \quad [5]$$

$$K = 4 * A^2/(U/t) \quad [6]$$

where,

T=applied torque, in-lbf
t=minimum thickness of section, in
A=area enclosed by median boundary, in^2
U=length of median boundary, in The enclosed area term (A), for the section described in FIG. 12, Section A—A, can be approximated by an area of an ellipse. The procedure for calculating the maximum shear stress in the section is describe below.

For comparison with the above calculations for the open section design, lets assume:

T=1000 in-lbf
a=1.1 in
b=0.9 in
t=0.188 in
L=1.0 in
G=3.9×10^6 psi

These numbers give approximately the same crown external geometry and minimum thickness of the section as the example discussed above. The center hole in Section A—A of FIG. 12 has a diameter D which can be calculated from, $$D = b - 2*t$$
$$= 0.9 - 2*.188$$
$$= 0.524 \text{ in}$$

The major and minor diameters for the ellipse can be calculated from, $$D_{maj} = .5(a+D)$$
$$= .5(1.1+.524)$$
$$= .812 \text{ in}$$
$$D_{min} = .5(b+D)$$
$$= .5(.9+.524)$$
$$= .712 \text{ in}$$

The area enclosed by the median boundary is thus, $$A = PI*D_{maj}*D_{min}/4$$
$$= 3.1416*.812*.712/4$$
$$= .454 \text{ in}^2$$

The perimeter of the ellipse is approximately, $$m = D_{min}/D_{maj} = .712/812 = .877$$
$$U = D_{maj}(4 + 1.1m + 1.2m^2)/2$$
$$= .812*(4 + 1.1*.877 + 1.2*(.877)^2)/2$$
$$= 2.39 \text{ in}$$

Using Equation 5, $$Ss(max) = 1000/(2*.188*.454)$$
$$= 5,857 \text{ psi}$$

Using the above value of U in Equation 6, $$K = 4 * (0.454^2)/(2.39/0.188) = 0.0649 \text{ in}^4$$

Using this value for K in Equation 2, $$Disp = 1000*1/(.0649*3.9E06)$$
$$= .00396 \text{ rad}$$

The above calculations show that for this example, the closed section design reduces the maximum shear stresses from 35 ksi to approximately 6 ksi, a reduction of over 80 percent. Regarding stiffness, the closed section design has a rotational displacement of 0.00396 rad, compared to 0.0459 rad for the open section design. This makes the closed section design 0.0459/0.00396=11.6 times as stiff as the open section design. Obviously, a substantial improvement in both the strength and stiffness of the part is realized by creating a closed, hollow section with two laterally oriented lightening holes, as proposed by this invention. A prototype crown part (FIGS. 7A and 7B) was fabricated. Actual measurements of the prototype crown gave a weight of 130 grams compared to 210–260 grams for leading prior art designs. This is a 40–50 percent weight reduction.

Figure 13:
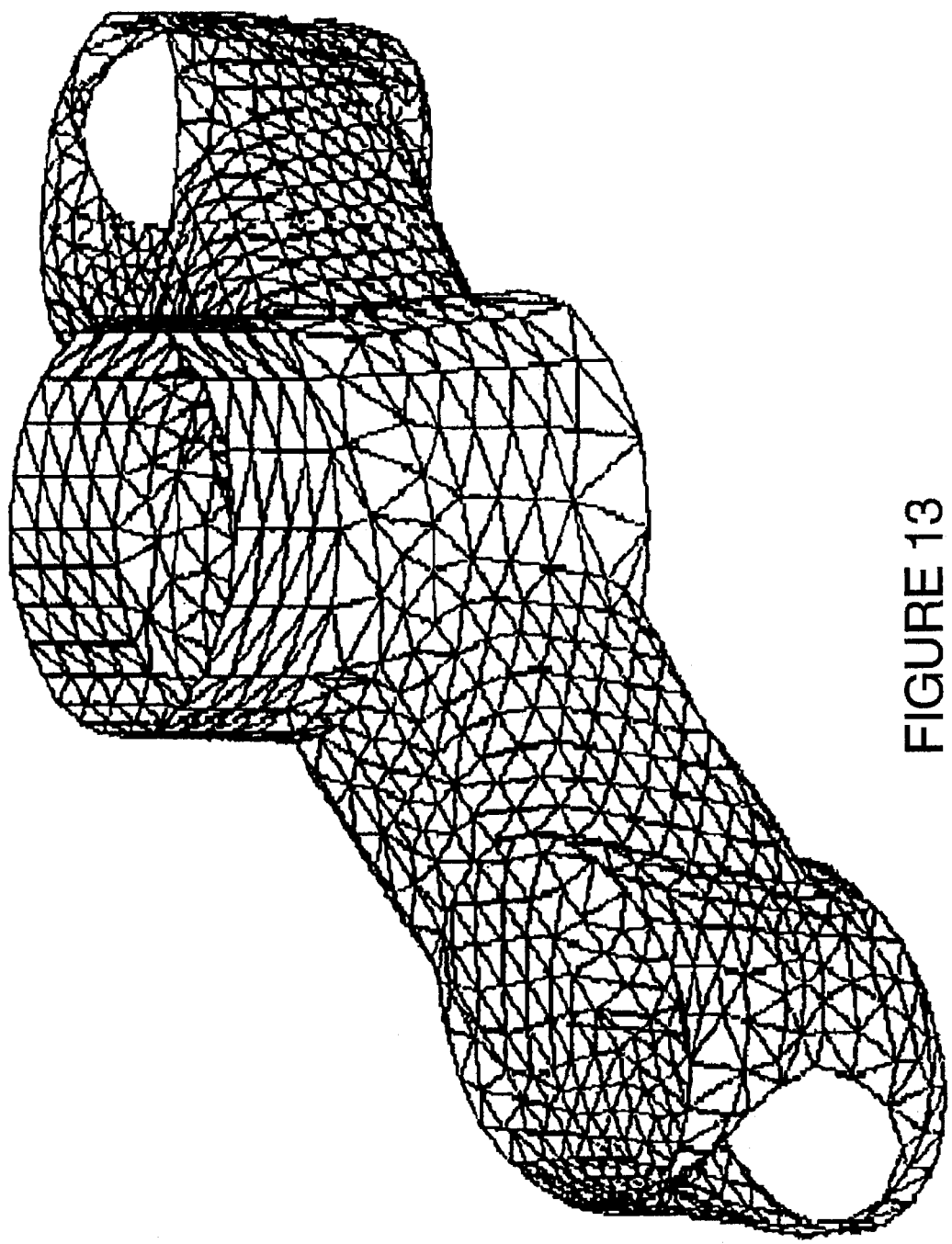
FIG. 13 shows a finite element analysis (FEA) model used to evaluate the improved crown design.
Figure 13:
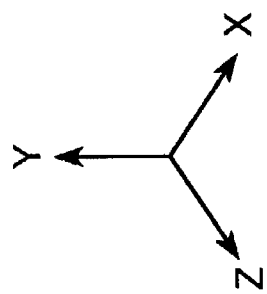

A computerized analysis of the improved crown design was conducted using the finite element analysis (FEA) method. FIG. 13 is an FEA surface model of a crown design covered by this patent. The model was constructed using 3-dimensional shell elements. Loads were applied to the model by simulated stanchion tubes to represent the "tube-in-socket" connection. The boundary conditions were applied via a simulated steerer tube. All of the "tube-in-socket" connections were given an internal pressure load to represent the interference fit. The results of the FEA study show that the closed section of the crown does indeed give relatively low stresses and improves the overall stiffness of the part. The peak localized stresses in the part were also identified and design modifications made to reinforce these areas against fatigue. FIGS. 7A and 7B shows a drawing of the finalized design.

IMPROVING THE CROWN-TO-STANCHION-TUBE CONNECTION

Figure 8A:
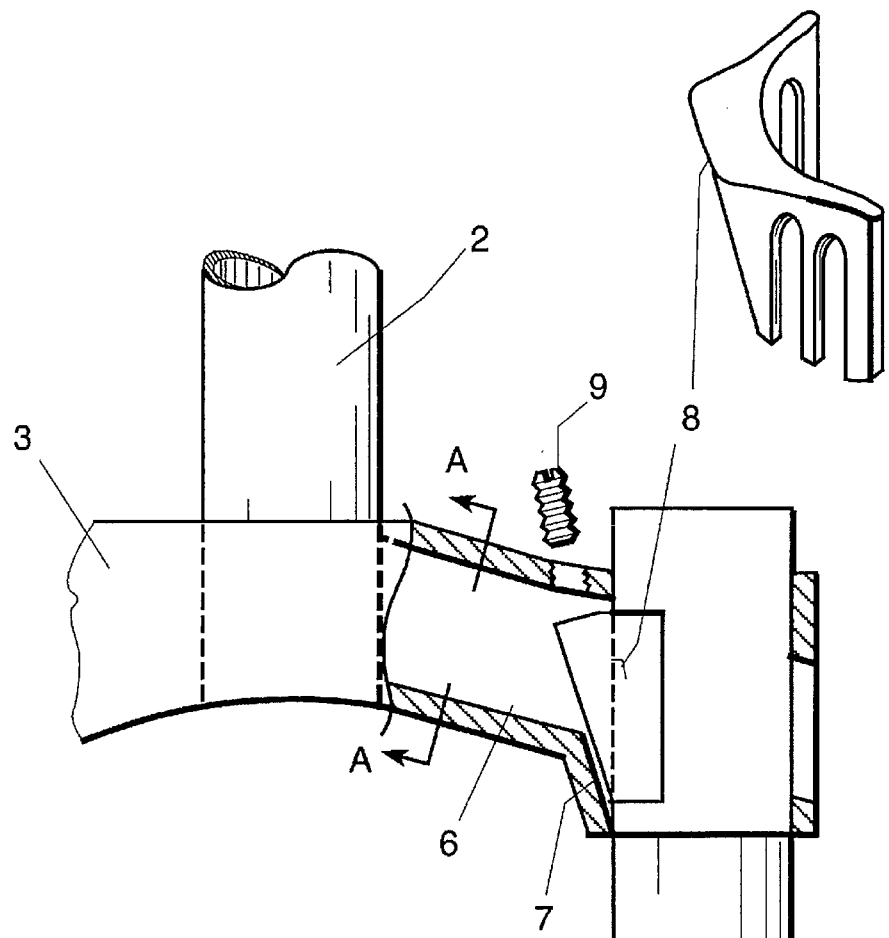
FIG. 8a is an exploded view of an improved stanchion/crown connection using several connecting methods, including socket connector members covered by this invention.
Figure 8B:
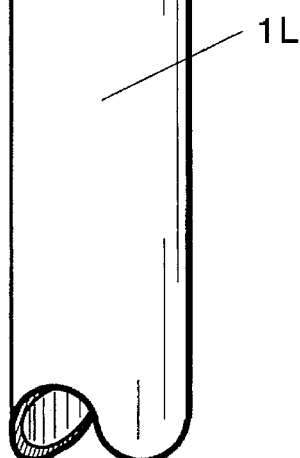
FIG. 8b is a section station on lines A—A of FIG. 8a, FIG. 8c is a modification.
Figure 8C:
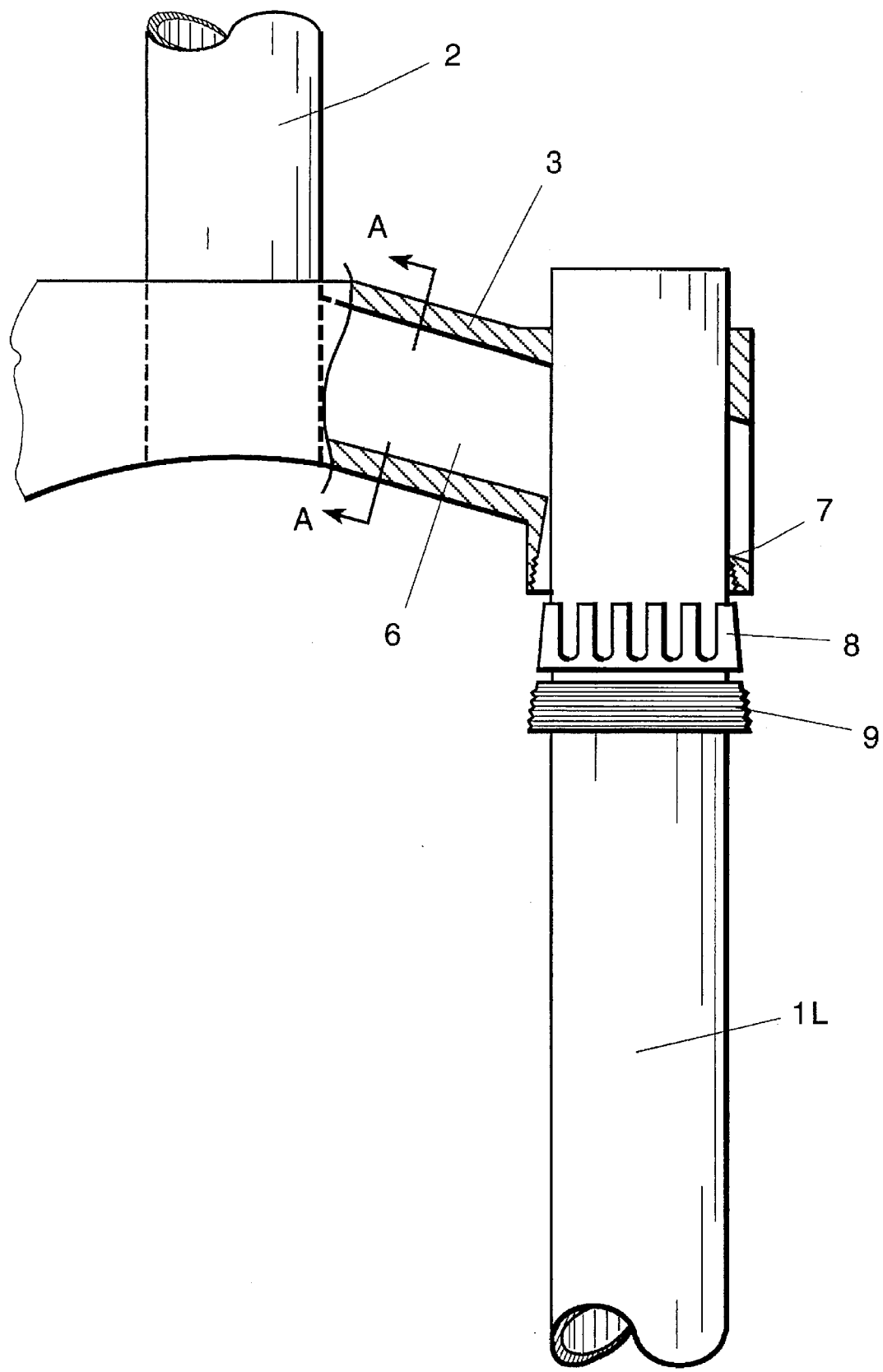
FIG. 8d is a further modification.
Figure 8D:
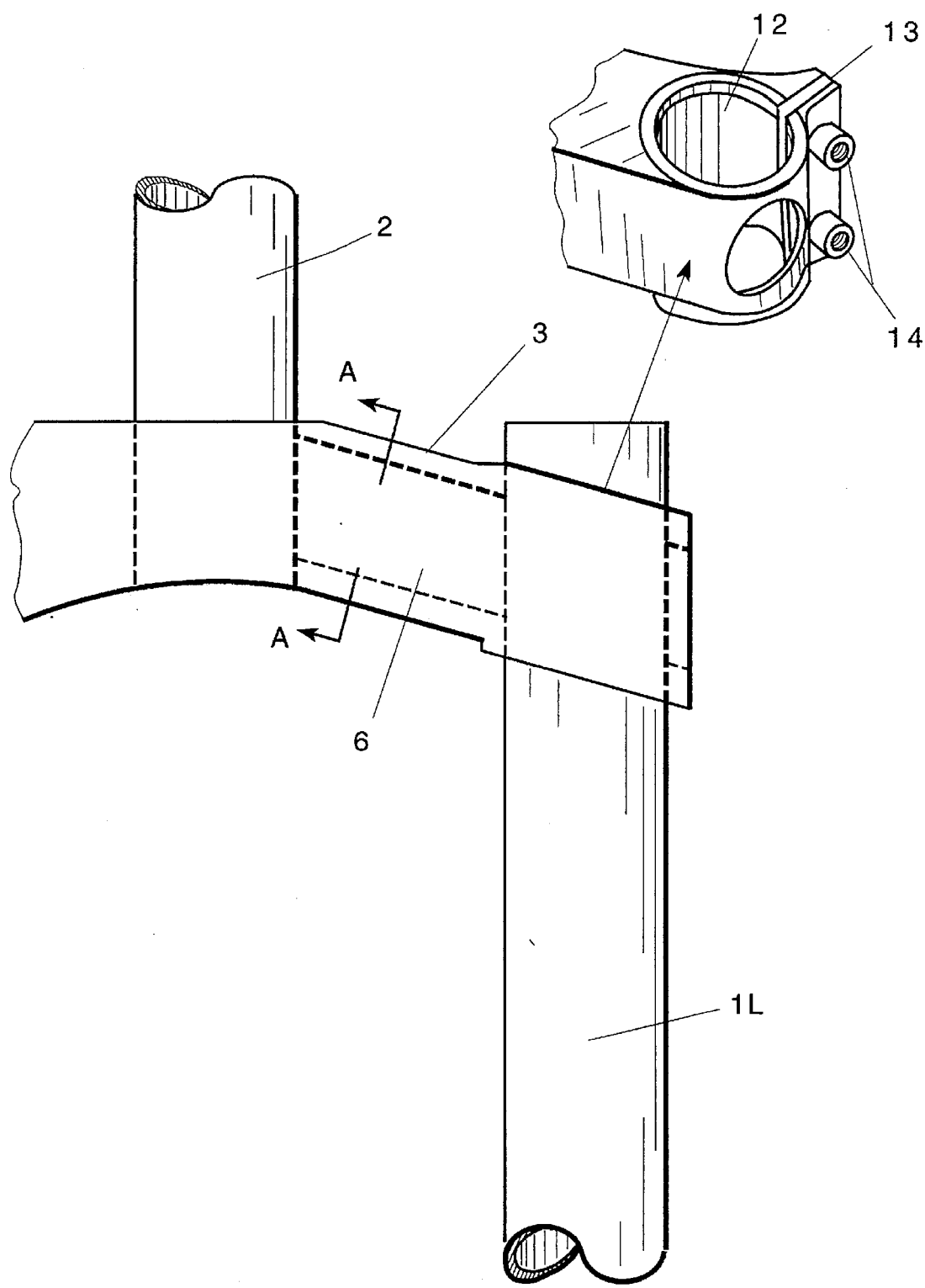

A further feature of this invention is the crown-to-stanchion-tube connection. The invention covers several possible joint connections as disclosed in FIGS. 8a, 8b and 8c. The concepts include a full or partial collet assembly loaded from the top or bottom of the joint as shown in FIGS. 8a and 8b. FIG. 8a shows a partial collet loaded from the top and FIG. 8b shows a full collet loaded from beneath. The full collet assembly shown in FIG. 8a is the preferred collet design. A "pinch-bolt" connection illustrated in FIG. 8c could also be used. The "pinch-bolt" concept consists of a slot 8-5 in the body of the crown (8-13) and one or more fasteners (8-14). When the slot is closed up by the fasteners, the stanchion tube in "pinched" inside of the crown socket (8-15). The collet assemblies illustrated in FIGS. 8a and 8b consist of an inner taper (7), a sliding compression wedge (8-8) and a set screw 8-9 (FIG. 8a), or ring adjuster screw, (8-9R) (FIG. 8c) to lock the wedge into position. In FIG. 8a, wedge 8-8 has a set of fingers 8F which are cammed inwardly by taper surface 8-7 as ring adjuster screw 8-9 is driven downwardly by rotation thereof. This camming action causes the fingers 8F to grip and lock stanchion tube 8-1L in position. The compression wedge can be made with or without the machined slots. The slots tend to make the wedge conform more closely to the mating surfaces thereby giving a more uniform locking force. The inner taper and the sliding wedge piece can be of any angle from 0.1 degrees to 18 degrees, relative to the axis of the stanchion tube. The compression wedge can be made of metal, an engineering plastic or reinforced plastic material. The collet assembly works by using the adjuster screw to force the wedge piece between the inner taper and the external surface of the stanchion tube, until the desired locking force is generated. The adjuster screws are loosened to disassemble the stanchion tubes.

The preferred method of assembly for economy of manufacture is an interference fit or bonding assembly, or a combination of the two. It is more costly to slot, drill and tap for pinch bolts, or make an additional part such as a wedge or collet. For ease of assembly and disassembly, the disclosed wedge or collet system is preferable to the pinch bolts, at least on the highly stressed crown designs. The threaded holes of the pinch bolts have demonstrated failures in use. Fatigue or yield cracks propagate from them. Also the pinch bolts apply a concentrated load on the stanchion tube, weakening it. The pinch bolts are typically located on the rear surface of the crown, which is where the stanchion tubes are compressively loaded during braking or when hitting an obstacle, the worst possible position. The bonded, wedge or collet assemblies evenly spread the clamping loads.

While preferred embodiments of the invention have been illustrated and described, it will be appreciated that various other embodiments and adaptations of the invention will be readily apparent to those skilled in the art.

What is claimed is:

1. An improved brake bridge in combination with a front fork bicycle suspension system having a pair of telescoping strut stanchion tubes wherein said brake bridge comprises a hollow member having two ends and a pair of socket connectors respectively securing each of said ends to each of said telescoping strut stanchion tubes, said brake bridge being made from a selected one of a metal extrusion and a reinforced plastic molding, each said socket connector comprising a shaped body with a cylindrical hole of constant diameter to accommodate one of the telescoping strut stanchion tubes, a constant diameter cylindrical socket for supporting respective ones of said ends of said hollow member and a threaded hole to support a brake stud, each said socket connector encircling a respective telescoping stanchion strut tube and secured thereto by a structural adhesive.

2. An improved brake bridge in combination with a front fork bicycle suspension system having a pair of telescoping strut stanchion tubes wherein said brake bridge comprises a hollow member having two ends and a pair of socket connectors respectively securing each of said ends to each of said telescoping strut stanchion tubes, said brake bridge being made from a selected one of a metal extrusion and a reinforced plastic molding, each said socketed connector comprising a shaped body with a cylindrical hole of constant diameter to accommodate one of the telescoping strut stanchion tubes, a tapered cylindrical socket having a pair of ends with a circular opening at one of said ends and a shaped opening at the other of said ends supporting a respective end of the brake bridge and a threaded hole to support a brake stud, each said socket connector encirculing a respective telescoping strut stanchion tube and secured thereto by a structural adhesive.

3. An improved brake bridge in combination with a front fork bicycle suspension system having a pair of telescoping strut stanchion tubes, each said telescoping strut stanchion tube having a ceneterline and a wall surface, wherein said brake bridge comprises a hollow member having two ends and a pair of socket connectors respectively securing each of said ends to each of said telescoping strut stanchion tubes, each socket connector comprising an adjustable collet assembly having a ramped surface with an angle from 0.1 degrees to 18 degrees relative to the respective telescoping strut stanchion tube centerline, a compression wedge, and an adjusting ring screw for forcing said compression wedge between said ramped surface and the wall surface of a respective telescoping stanchion strut tube thereby creating a locking force between said socket connector and a respective telescoping stanchion strut tube.

4. An improved separate, hollow, bicycle crown member for use on a telescoping bicycle front fork suspension system having a stanchion tube and a steerer tube, said bicycle crown member comprising a stanchion tube socket connection, a steerer tube socket connection and a structural part connecting said stanchion tube socket connection and the steerer tube socket connection, said structural part having a closed hollow shape without welding, said bicycle crown member further comprising a single light metal forging have five intersecting hollow closed sections, said metal forging being center bored and reamed, said bicycle crown member including a lightening hole drilled axially through said structural part from an outside surface of the stanchion tube socket connection to an inside surface of the steerer tube socket connection, to form a closed, tubular section thereby increasing the stiffness of the part and decreasing the stresses induced by bending and torsional loads.

5. The bicycle crown member defined in claim 4 wherein said steerer and stanchion tube socket connections have openings and localized reinforcement ridges around the openings of the steerer and stanchion tube socket connections to provide localized strength and rigidity at minimum weight, said reinforcement ridges being blended into the main body to reduce stress concentrations and improve the fatigue life of the part.

6. In a telescoping-type front fork bicycle suspension system having a fork crown member rigidly connected to a steer tube and a pair of spaced stanchion tubes, a strut telescoped on each of said stanchion tubes having an upper ends, a brake bridge having a pair of lateral ends and means securing one of said lateral ends to one of said struts and the other of said lateral ends to the other of said struts, the improvement wherein said brake bridge is a hollow member and said brake bridge comprises a pair of socket connector members, each said socket connector member having a first end embracing the upper end of a respective strut, a second end forming a socket embracing a respective lateral end of said brake bridge and means securing said respective strut in said socket connector members, and wherein each said socket connector member includes an internal tapered cam surface, a collet member having tube gripping fingers and a tapered exterior surface, a threaded surface in said socket connector member, a threaded member engaged with said threaded surface for engaging and driving said collet member and said tapered exterior surface along said cam surface to cause said tube gripping fingers to engage and lockingly grip a respective one of said stanchion tubes received in said socket.

7. In a telescoping-type front fork bicycle suspension system having a fork crown member rigidly connected to a steerer tube, a pair of spaced stanchion tubes, a strut telescoped on each of said stanchion tubes, a brake bridge having a pair of lateral ends, and means securing one of said lateral ends to one of said struts and the other of said lateral ends to the other of said struts, the improvement wherein said fork crown member has a portion thereof extending between said steerer tube and each of said stanchion tubes, each said portion being a closed hollow integrally formed member, and wherein said fork crown member further comprises a single lightweight center bored and reamed forging having five intersecting hollow, closed sections.

8. In a telescoping-type front fork bicycle suspension system having a fork crown member rigidly connected to a steerer tube, a pair of spaced stanchion nubes having upper ends, a strut telescoped on each of said stanchion tubes, a brake bridge having a pair of lateral ends, and means securing one of said lateral ends to one of said struts and the other of said lateral ends to the other of said struts, the improvement wherein said fork crown member comprises a portion thereof extending between said steerer tube and each of said stanchion tubes, each said portion being a closed hollow integrally formed member, and wherein said fork crown member further comprises a pair of lateral ends, a pair of stanchion tube receiving sockets therein and means securing the upper ends of said stanchion tubes in said sockets, respectively, wherein said means securing the upper ends of said stanchion tubes in said sockets includes a collet member having stanchion tube gripping fingers, a tapered exterior surface, a cam surface formed in said socket, a threaded surface in said socket, and a threaded member engaged with said threaded surface for engaging and driving said collet member tapered exterior surface along said cam surface to cause said stanchion tube gripping fingers to engage and lockingly grip said stanchion tube.

* * * * *